No. 705,863. Patented July 29, 1902.
H. H. PORTER.
BEARING.
(Application filed Jan. 5, 1900.)
(No Model.)

Witnesses:
Alice Houghton
Otis A. Earl

Inventor,
Henry H. Porter
By Fred L. Chappell
Att'y.

UNITED STATES PATENT OFFICE.

HENRY H. PORTER, OF DOWAGIAC, MICHIGAN.

BEARING.

SPECIFICATION forming part of Letters Patent No. 705,863, dated July 29, 1902.

Application filed January 5, 1900. Serial No. 506. (No model.)

*To all whom it may concern:*

Be it known that I, HENRY H. PORTER, a citizen of the United States, residing at the city of Dowagiac, in the county of Cass and State of Michigan, have invented certain new and useful Improvements in Ball-Bearings, of which the following is a specification.

This invention relates to improvements in ball-bearings for vehicles.

The objects of the invention are to provide in connection with ball-bearings for vehicles an efficient and simple means of excluding the water, dust, grit, and dirt from the same and at the same time avoid the use of felt, rubber bands, or leather washers for the purpose, as such bands soon become dirty and cause a good deal of friction in themselves, besides not being fully effective for the purpose intended.

Further objects of this invention are to provide an improved means of supporting a dust-band in a bearing and provide an improved combined dust-band and ball-retaining ring for use in ball-bearings.

Still further objects will definitely appear in the detailed description to follow.

I accomplish these objects of my invention by the devices and means described in this specification.

The invention is clearly defined, and pointed out in the claims.

A structure fully embodying the features of my invention is clearly illustrated in the accompanying drawings, forming a part of this specification, in which—

Figure 1:
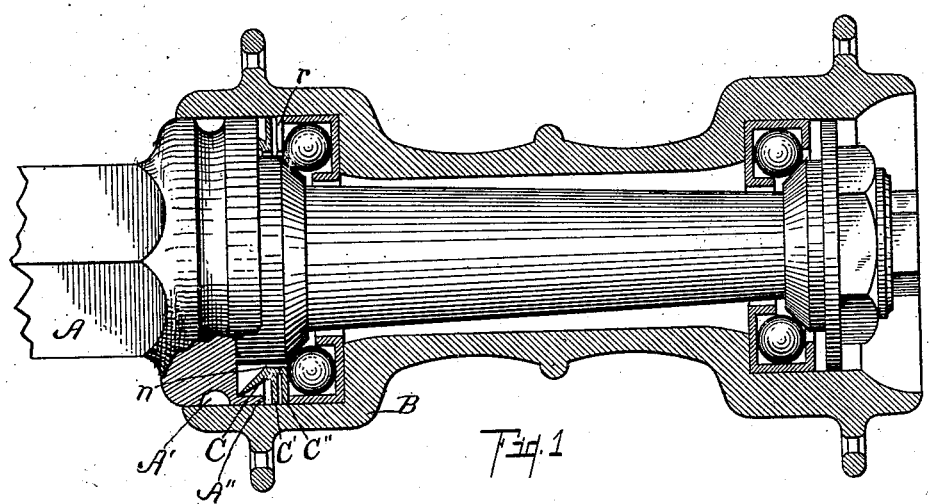
Figure 2:
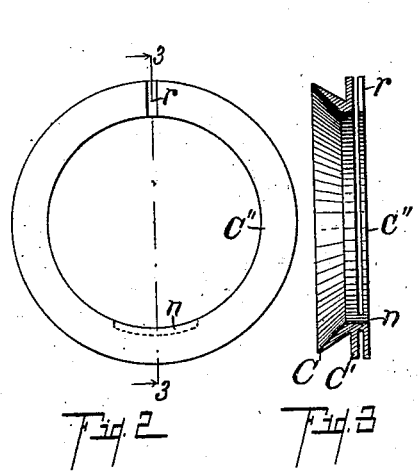
Figure 3:
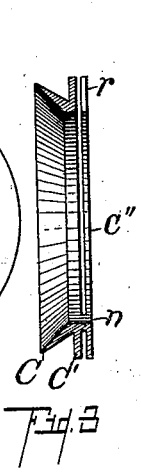
Figure 4:
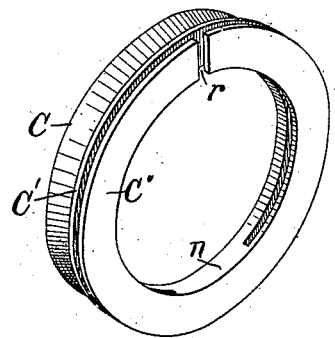

Figure 1 is a detail view of a hub and axle embodying my improved ball-bearing in position, the hub and a portion of the axle being shown in section. Fig. 2 is a detail sectional view of the combined dust-band and ball-retainer. Fig. 3 is a vertical sectional view of the same, taken on line 3 3 of Fig. 2. Fig. 4 is a detail perspective view of the combined ball-retainer and dust-band.

In the drawings similar letters of reference refer to similar parts throughout the several views.

A is the axle, and B is the hub. In this structure the hub shown is the hub of a wire wheel; but the bearing is equally well adapted to use in wooden hubs, though of course means are necessary to be provided to hold the boxing in position.

My invention relates more particularly, as before stated, to improved means of excluding water, sand, and dirt from the bearing at the inner end of the hub. The usual ball-race is provided at that point with cone extending into the same. The axle A is enlarged into a collar at this point, fitting into a suitable flange on the hub or boxing. I form a dust-groove A' on the collar just within the bearing. The collar is then extended into a flange A", having a shoulder at its inner side, from which point the axle extends forwardly, terminating in the cone against which the balls revolve. I retain the balls in their races by a combined ball-retainer and dust and water band. The same is made in the form of a ring. This is divided into an inner portion C" by a suitable kerf, and this inner portion is divided at $r$ and slightly expanded, so that it will be held within the hub by its own elasticity. A little web $n$ opposite the division $r$ is all that connects this part to the dust-band. This is formed with a portion C', parallel with the retaining portion C", and a V-shaped extension C extends from the inside portion flaringly outward something like a flaring flange, terminating in a thin edge, which is arranged within the flange A" of the axle. It will be seen by this formation that any dust, dirt, or water entering the bearing will find a lodging-place in the groove A' in the first instance. Whatever may pass from that point will find a lodging-place in the angle between the ring portion C' and the V-shaped portion C. Whatever may be carried beyond that will find a lodging-place between the V-shaped flange C and the axle at that point. With these places provided for catching and retaining the dust it has been found to keep the bearing perfectly free from dust for an indefinite period. The outer end of the bearing requires no such protection. Dust does not enter at that point. A simple cap on the end of the hub closes it perfectly as an extra precaution when desired.

I desire to state in this connection that my improved construction is very effective in excluding the dust and water with other means of support for the dust-band than these I have shown. I also desire to remark that the improved means I have shown for supporting the dust-band or axle within the hub will be found very advantageous with any style of dust-band, though I believe the exact structure I have shown to possess merits over any other.

While it is of great advantage to form all of a single piece, parts might be formed separately and suitably united.

Having thus described my invention, what I claim as new, and desire to secure by Letters Patent, is—

1. In a bearing for vehicles, the combination of the axle with a suitable collar having a flange; a hub or boxing; a dust and water band combined with a ring to fit within the hub, the said dust and water band having an outwardly-projecting V-shaped portion fitting into the flange of the axle, for the purpose specified.

2. In a bearing for vehicles, the combination of the axle with a suitable collar having a flange; a hub or boxing; a dust and water excluder consisting of a band and an outwardly-projecting V-shaped portion carried by said hub or boxing and fitting within the flange of the axle, for the purpose specified.

3. The combination of a dust and water band having an outwardly-projecting V-shaped portion and means of supporting the same within the hub of a wheel.

4. A dust and water band or ring having a V-shaped projection and a retainer-ring open at one side and connected to said dust and water band or ring by a small web, all formed of a single integral piece, for the purpose specified.

5. A dust and water band or ring having a V-shaped projection C and a ring portion $C'$; and a ring $C''$ open at one side at $r$ and connecting by a small web $n$ to one side of the dust-band all formed of a single piece for the purpose specified.

6. A dust and water band and a retainer band or ring open at one side, and connected by suitable means to said dust and water band, for the purpose specified.

In witness whereof I have hereunto set my hand and seal in the presence of two witnesses.

HENRY H. PORTER. [L. S.]

Witnesses:
EDWARD F. HOWE,
JUD S. CLARY.